United States Patent [19]

Tindall et al.

[11] Patent Number: 4,518,195

[45] Date of Patent: May 21, 1985

[54] WINDOW STRUCTURE FOR TRACTOR CAB

[75] Inventors: Gary W. Tindall, Hazel Green, Wis.; George P. Lysenko, Dubuque, Iowa; Richard J. Vize, Dubuque, Iowa; Edward H. Kiefer, Dubuque, Iowa; Richard J. Smith, Dubuque, Iowa

[73] Assignee: Deere & Company, Moline, Ill.

[21] Appl. No.: 573,550

[22] Filed: Jan. 25, 1984

[51] Int. Cl.³ .............................................. B60J 1/18
[52] U.S. Cl. ................................. 296/148; 296/84 A; 296/190; 49/126
[58] Field of Search ................. 296/190, 84 R, 84 A, 296/84 D, 84 H, 147, 148, 146; 49/386, 126; 160/212

[56] References Cited

U.S. PATENT DOCUMENTS

| | | | |
|---|---|---|---|
| 1,302,742 | 5/1919 | Weiss | 296/147 |
| 1,313,186 | 8/1919 | Howard | 296/147 |
| 2,815,243 | 12/1957 | Campbell | 296/190 |
| 3,866,969 | 2/1975 | Sandrock et al. | 296/190 |
| 3,993,346 | 11/1976 | Mounts | 296/84 N |
| 4,072,338 | 2/1978 | Lawrence et al. | 296/190 |
| 4,116,483 | 9/1978 | Kramer et al. | 296/84 A |
| 4,174,129 | 11/1979 | Schwandt et al. | 292/216 |
| 4,443,035 | 4/1984 | Saemann | 296/190 |

Primary Examiner—Robert R. Song

[57] ABSTRACT

A window structure for closing an opening in an upright wall of a cab structure composed of upper and lower glass panels having adjoining horizontal edges. A horizontal hinge connects the upper edge of the upper panel to the cab structure so that the upper panel can swing inwardly to an upper horizontal position just under the roof of the cab. The lower panel may be mounted in the lower portion of the opening or on the rear face of the upper panel and when in the latter position, upper and lower panels may be swung upwardly against the roof of the cab and latched in this position. A gas-pressurized cylinder is used between the cab structure and the upper panel to aid in both raising the panels and to restrain the panels as they are lowered.

8 Claims, 8 Drawing Figures

WINDOW STRUCTURE FOR TRACTOR CAB

BACKGROUND OF THE INVENTION

Window structures are provided in tractor cabs so that when preferred, they can either completely enclose the cab or be open for ventilating purposes. When air conditioning or heating a cab, a rather tight cab is required. However, in many instances, an operator of a piece of farm equipment or industrial equipment will prefer that the windows of the cab be open for better visibility or for ventilating purposes.

When removing the window from its opening, provision must be made for storing the window. In some instances, the window is swung outwardly. However, this creates a situation where products often generated through operation of the farm implement or industrial equipment may damage the window. The cab of the tractor is relatively small and limits the storage area where the window may be stored. Also, if the window is just loosely stored within the cab, it often becomes damaged through operator negligence or through vibration or movement of the tractor.

SUMMARY OF THE INVENTION

With the above in mind, it is the primary purpose of the invention to provide a window structure for closing an opening in an upright wall of a tractor cab. The window structure is composed of upper and lower window panels or sections, the lower of which may be bodily removed from the window frame and stored behind the upper window panel. The upper panel is horizontally hinged on its upper edge so that the panel, and the lower panel, if it is stored on the upper panel, may be swung inwardly of the cab and underneath the cab roof. Suitable latches are provided on each side of the cab to catch the edges and hold the two panels in an upper horizontally disposed storage disposition. Panels of the size used on large farm tractors or industrial equipment tractors have considerable weight. Thus, it is a further object of the present invention to provide power means which helps the operator raise the two window panels and which also restrains the dropping of the windows as they move from their horizontal disposition to the vertical disposition in the window frame of the cab.

More specifically, it is an object of the invention to provide very simple structure to adequately store the windows in the cab where they will be safe from damage. This is done by providing elements adjacent the lower edge of the lower panel or section on the frame of the tractor and on the inner face of the upper panel. The elements are formed with upwardly opening notches so that the lower edge portion of the lower panel or section may rest in the notches. Suitable latches are provided on the side of the window frame and the inner face of the upper panel so that the lower panel may be fixed in its position where it closes the lower window opening or in its upper stored position inwardly of the upper panel.

DESCRIPTION OF THE PREFERRED EMBODIMENT

Figure 1:
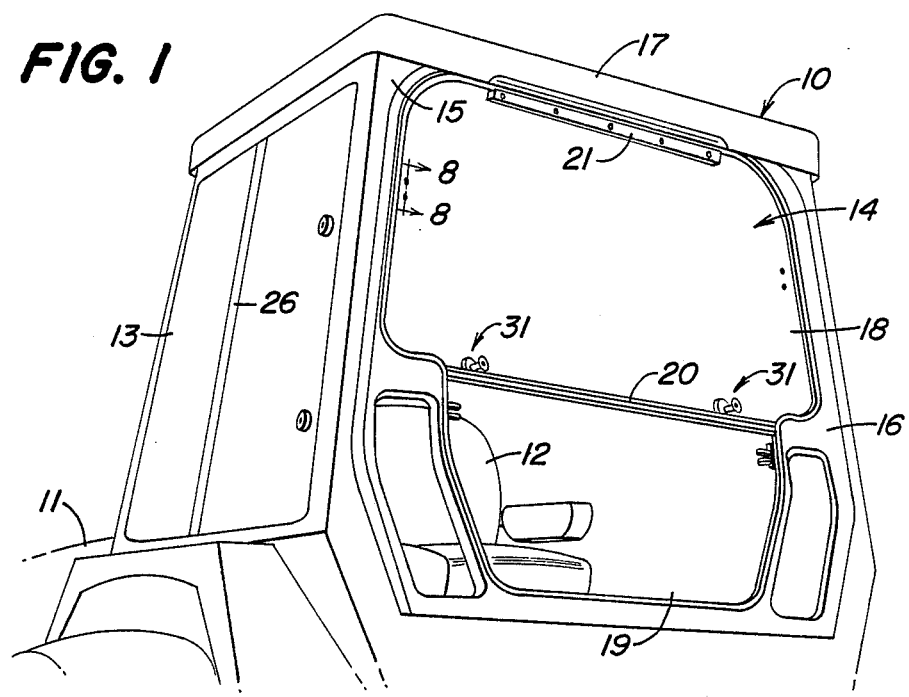
FIG. 1 is a rear perspective view of a cab structure for a tractor having the window structure of the present invention.
Figure 4:
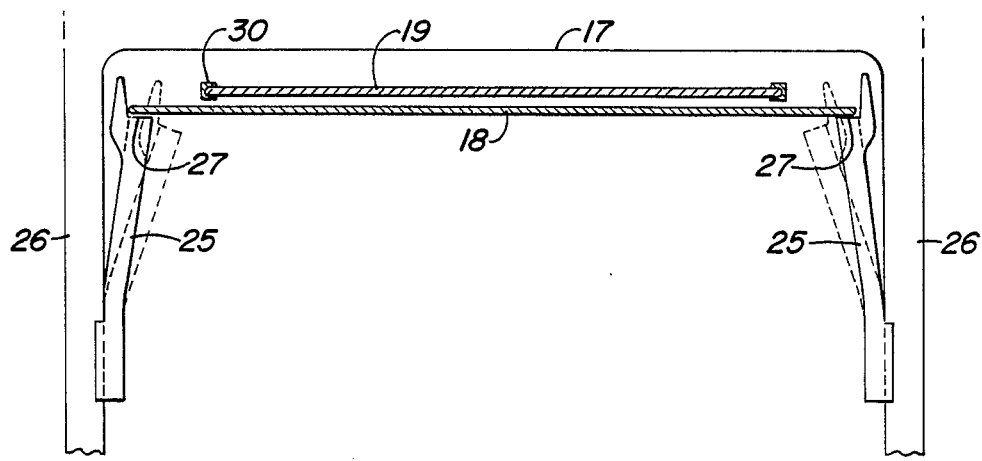
FIG. 4 is a sectional view taken along the line 4—4 of FIG. 3 and showing the window structure in its upper or stored condition.

A cab 10 is provided to enclose the operator station of a tractor, shown only partially at 11. The operator station includes a seat 12 that is swiveled to face forwardly or, as shown in FIG. 1, to face rearwardly. The cab 10 has side windows 13 on opposite sides thereof, a front window (not shown) and a rear window structure indicated in its entirety by the reference numeral 14. The rear wall 15 of the cab 10 has a large opening therein that receives a window frame 16. The cab 10 further has a roof or overhead 17. Fitted into the window frame 16 are upper and lower vertical panels 18, 19. The panes or panels 18, 19 are generally co-planar and have adjoining horizontal edges at their lower and upper ends, respectively. A grommet or weather seal 20, of conventional nature, seals the edges against leakage. An upper horizontal edge of the upper panel 18 is horizontally hinged at 21 to a horizontal portion 22 of the window frame 16. The upper panel 18 may, therefore, swing inwardly on its hinge 21 from its normal upright position to a horizontal position underlying the roof 17 of the cab. A pair of plastic latch elements 25 are fixed to vertical structural members 26 on opposite sides of the cab 10. Each latch member 25 has a shoulder 27 that is positioned to underly the respective fore-and-aft edges of the window panel 18 when it is in its uppermost position, as shown in FIG. 4. When the window panel 18 is in its vertical position, the latches 25, due to their resiliency, take the positions shown in dotted representation in FIG. 4. Therefore, merely by raising the panel 18, the edges of that panel ride against the inner faces of the latch elements 25 and distort them to the positions shown in full in FIG. 4. To release the window panel 18 from the latch elements 25, the operator pushes outwardly on the respective latch elements and the edges of the window panel 18 are released.

Bordering the lower panel 19 is a border frame 30 that completely circumscribes the panel 19. A pair of lug structures 31 project inwardly from the window frame 16 at opposite lower corners of the panel 19. Each lug structure is composed of a plastic knob 32 that has an internally threaded surface 33 receiving a threaded bolt 34. An opening is provided in the lower panel of the frame 5 and a plastic liner, such as is shown at 35, sits in the opening and a washer 36 fits externally to the gasket 35. By threading the bolt 34 into the threaded area 33, the lug 32 is held rigidly on the lower panel of the cab. The structures 31 form upwardly open notches, such as at 37, adjacent the lower edge of the window opening. The lower panel 19 and more specifically, the border 30, rests in these notches 37.

Fixed to the respective border portions at the upper corner sections of the panel 19 are a pair of latch members 40 which are spring-loaded to force a lock bolt 41 into a slot 42 carried in an L-shaped bracket 43. A pair of finger controls 44, 45 is used to open or retract the lock bolt 41 from the slot 42. The L-shaped member 43 is fixed internally of the cab of the rear window frame 16.

Figure 7:
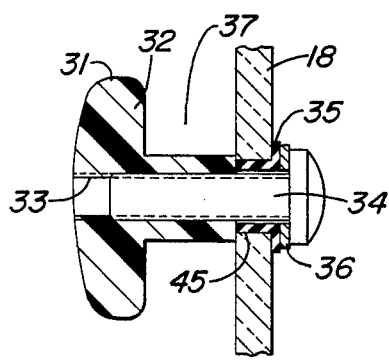
FIG. 7 is a sectional view taken substantially along the line 7—7 of FIG. 2.
Figure 8:
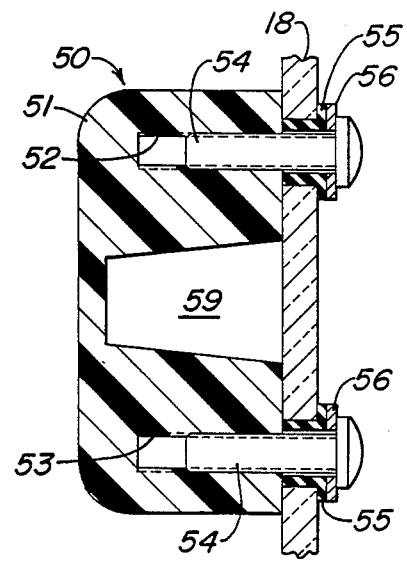
FIG. 8 is a sectional view taken substantially along the line 8—8 of FIG. 1.

Provision is made for storing the lower panel 19 behind and inboard of the upper panel 18. Such provision is accomplished by a pair of knobs 31 that are fixed to and positioned just inboard the lower edge of the upper panel 18. Referring to FIG. 7, the window panel 18 has an opening therein that receives the gasket 35 and bolt 34. Other than the opening in the glass panel 18, the entire lug structure 31 is identical to those that extend through the lower panel of the window frame 16. The two lugs 31 on the upper panel 18 are positioned to receive the curved corner sections of the lower panel 19.

Figure 2:
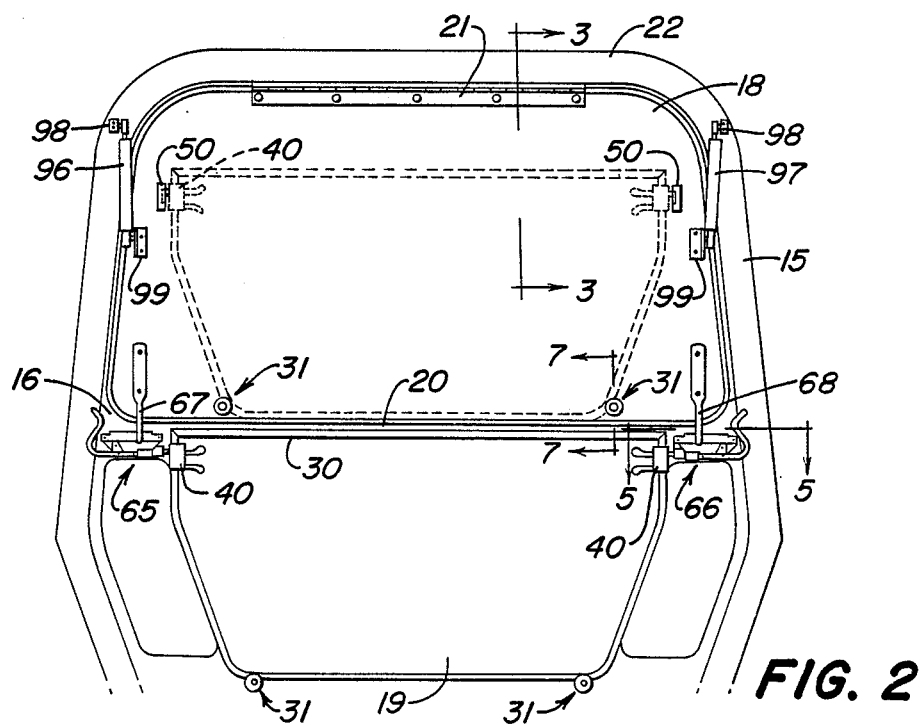
FIG. 2 is a view from inside the cab, looking rearwardly through the window structure.

Fixed to the inner surface and projecting inwardly from the upper panel 18 are a pair of latch-receiving elements 50 that are fixed to the upper panel 18 at the upper corner portions thereof. Each latch-receiving element is composed of a hard plastic member 51 having upper and lower threaded openings 52, 53 that receive bolts 54 projecting through suitable openings in the glass panel 18. The edges of the openings are protected by plastic gaskets 55 that are received in the respective openings and washers 56 that fit under the respective bolt heads 54. Centrally located in the element 51 is a latch-receiving opening 59. As best seen in FIG. 2, each of the latch-receiving structures 50 is positioned to receive the latch bolt 41 when the lower panel 19 is stored behind or inboard of the upper panel 18. When the lower corner edges sit in the notches of the elements 31, as shown in dotted line in FIG. 2, the latch elements 40 will be properly aligned with respect to the latch-receiving elements 50.

Latch structures 65, 66 are provided on opposite sides of the frame 15 and receive latch bolts 67, 68 that are fixed to the upper panel 18 and extend downwardly from the lower edge of that panel. Other than facing in opposite directions, the latches 65, 66 are identical and consequently, only the description of the latch 66 will be given in detail.

Figure 5:
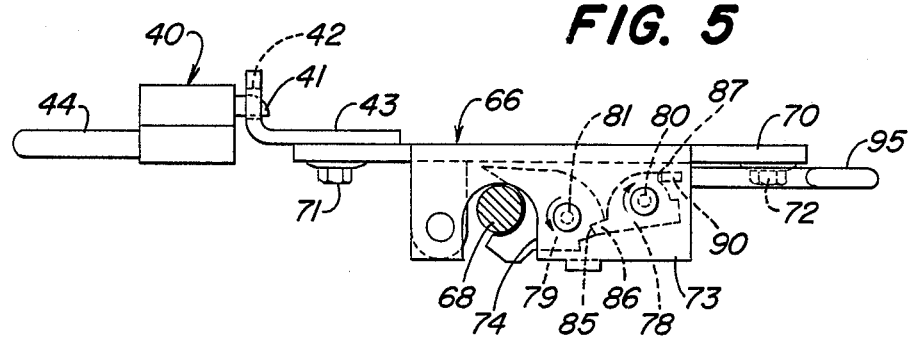
FIG. 5 is an enlarged sectional view taken substantially along the line 5—5 of FIG. 2.
Figure 6:
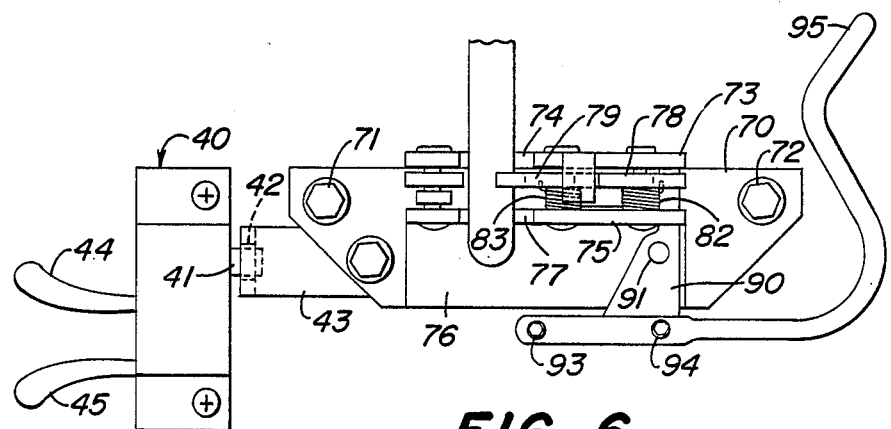
FIG. 6 is a front view of the latch structure shown in FIG. 5.

The latch 66 is composed of a main support plate 70 which is bolted at 71, 72 to the wall panel of the frame 16. The support 70 has a horizontal plate portion 73 projecting into the cab with a U-shaped opening or notch 74. A similar horizontal plate 75, with an indentical U-shaped notch 77, is positioned downwardly from the plate 73. The plate 75 is also part of an L-shaped angle iron plate 76 whose vertical section is welded or otherwise fixed to the face of the plate 70. A pair of interacting latch elements 78, 79 are mounted on a pair of vertical pivot pins 80, 81, respectively, the latter extending and being fixed to the respective upper and lower plate portions 73, 75. The pins 80, 81 carry torsion springs 82, 83, respectively, that are connected to the latch elements 78, 79, respectively, and bias the elements in directions, as viewed in FIG. 5. The latch element 79 has a notch 85 on its outer edge that receives a projection 86 on the edge of the latch element 78. The latch element 78 has a shoulder 87 on its edge that receives the upper end of a latch control member 90. The control member 90 is a lever pivotally mounted at 91 on the plate 76. The control member 90 projects downwardly beneath the support panel 70 where it is pinned at 93, 94 to a hand control member 95. The latch element 79 has an edge that projects into the areas defined by notches 74, 77 for engaging the surface of the latch bolt 68. In FIG. 5, the bolt 68 is shown in its fully latched position. However, referring to the edge of the latch element 79, it becomes clear that when not engaged in the latching position, the latch element 79 will move clockwise to a position where the U-shaped notches 74, 76 are generally open. As the bolt 68 moves into the notches 74, 77, it engages the surface of the latch elements 79, pushing it to a position shown in FIG. 5. When in such a position, the shoulder 85 is in a position to receive the lugs 86 and the shoulder 87 receives the latch control member 90 which holds the bolt 68 in a locked position. When it is desired to release the bolt 68, an operator merely pulls on the lever portions 95 so as to move the upper end 90 of the latch element from engaging the shoulder 87. When released, the latch element 78 will move in a clockwise direction due to the torsion spring 82 and the lug portion 86 will depart from the shoulder area 85. The torsion spring between the pin 81 and element 79 will cause the latch element 79 to swing in a counterclockwise direction thereby releasing the latch bolt 68 from the recessed slots 74, 77.

Figure 3:
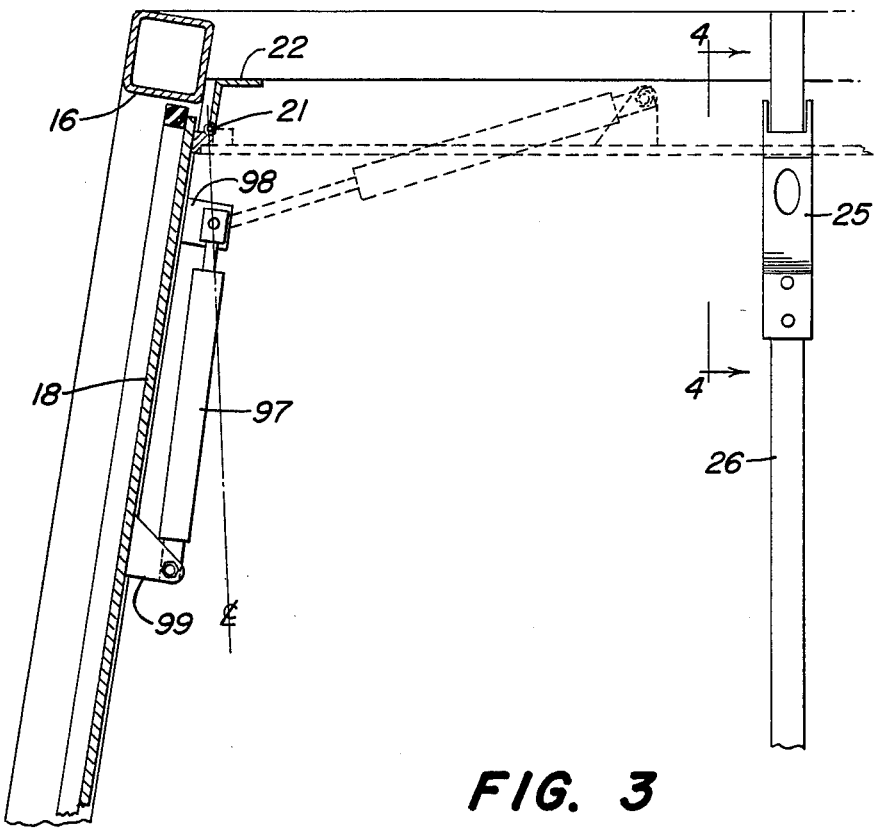
FIG. 3 is an enlarged sectional view taken substantially along the line 3—3 of FIG. 2.

Referring now to FIGS. 2 and 3, there is provided on opposite sides of the cab frame 15 and on the inner side thereof a pair of gas-operated cylinders 96, 97. The gas is moved into the cylinders 96, 97 so as to always create a force on the piston which will cause the cylinder and their respective pistons to expand or increase in length. The cylinder 97 is pivotally connected to a bracket 98 fixed to the inner face of the window frame 16. The lower end of the cylinder 97 is pivotally connected to a bracket 99 having a flat surface thereof fixed to the inner face of the upper window pane 18. Referring to FIG. 3, it will be noted that when the window is in its closed position in the rear wall 15, an extension of the axis of the cylinder 97 is to the right of the axis of the hinge 21. However, upon the bolts 67, 68 being released, the pane 18 will swing slightly rearwardly due to gravity, as well as a spring-load created by the various grommets and sealing members and the lower end of cylinder 97 will swing right, as viewed in FIG. 3. In this position, the centerline extension of cylinder 97 moves to the left of the axis of the hinge 21. As mentioned previously, the cylinder 97 is always biased towards expansion. Consequently, the expansion force of the cylinders 96, 97 will help to raise the window pane 18 and the window pane 19, when it is stored on the pane 18, to its uppermost position shown in FIGS. 3 and 4 where the latch elements 25 contact and hold the respective panels in their uppermost position in underlying relation to the roof of the cab. Conversely, when it is desired to pull or move the panels 19, 18 from their stored position, as shown in FIGS. 3 and 4, to their rear wall position, the latches 25 are released and the weight of the panels will tend to cause the respective panels 18, 19 to gravitate. However, the cylinders 96, 97 will resist compression and consequently, the released panels can be lowered very gently and safety by the operator.

We claim:

1. A window structure for closing an opening in an upright wall of a cab structure composed of upper and lower glass panels with adjoining horizontal edges and positioned in upper and lower portions of the opening, horizontal hinge means connecting the upper portion of the upper panel to the cab structure for permitting the upper panel to swing inwardly between an open position in which the upper panel is closely adjacent and in underlying relation to the roof of the cab and a closed position in said opening; structure mounted on the cab structure adjacent the lower portion of the opening and on the inner face of said upper panel having upwardly opening notches for receiving the lower edge of the lower panel; complementary latch elements on the lower panel, the cab structure and the inner face of said upper panel for retaining said lower panel in its closed position when its lower edge is seated in the notches of said structure on the cab structure, and on the inner face of said upper panel for retaining said lower panel on the inner side of said upper panel when its lower edge is seated in the notches of the structure on the inner face of said upper panel; an elongated, extendable member biased toward extension pivotally mounted at opposite ends to the cab structure and said upper panel, said line of force of said elongated member swinging to opposite sides of the axis of said hinge means as the upper panel moves towards its open and closed positions.

2. A window structure for closing an opening in an upright wall of a cab structure composed of upper and lower glass panels with adjoining horizontal edges and positioned in upper and lower portions of the opening, horizontal hinge means connecting the upper portion of the upper panel to the cab structure for permitting the upper panel to swing inwardly between an open position in which the upper panel is closely adjacent and in underlying relation to the roof of the cab and a closed position in said opening; structure mounted on the cab structure at the lower portion of the opening and on the inner face of said upper panel for selectively retaining said lower panel in its closed position in said lower portion of the opening and on the inner face of said upper panel for retaining said lower panel on the inner side of said upper panel; and latch means on said cab structure engageable with and for holding said upper panel in said open position.

3. The invention defined in claim 2, further characterized by at least one extendable, elongated member biased toward extension and mounted at opposite ends to the cab structure and said upper panel, said line of force of said elongated member swinging to opposite sides of the axis of said hinge means as the upper panel moves towards its open and closed positions.

4. The invention defined in claim 3 in which the structure for retaining the lower panel in its closed position and on the inner side of the upper panel are notched elements on the cab structure at the lower portion of the opening and on the inner side of the upper panel adapted to receive and hold the lower edges of the lower panel and further characterized by complementary latch elements, part of which are the lower panel and the other part of which are on the cab structure and upper panel for selectively latching the lower panel in its closed position or in its position on the inner side of the upper panel.

5. The invention defined in claim 4 in which the complementary latch elements are aligned only upon the lower panel being seated properly in the notched elements.

6. The invention defined in claim 5 in which the latch elements on the upper panel project inwardly from the face of the upper panel and are fixed to the upper panel by bolts that extend from the outer side of the panel through the panel and into the latch elements.

7. A window structure for a tractor cab having a window frame with a window opening, said window structure comprising upper and lower window sections generally in a coplanar relation for closing said window opening, said sections being joined at a lower horizontal edge of the upper panel and an upper horizontal edge of the lower panel; a horizontal hinge mounting the upper portion of said upper window section on the frame, permitting the latter section to swing inwardly; latch means for retaining the upper section in a closed position and an upper open position underlying the cab roof; elements having upwardly opening notches on the frame beneath the opening and on the upper window section adjacent its lower edge, said notches being positioned to selectively receive the lower edge of the lower panel; and complementary latch members, part being on the lower panel and complementary parts on the upper window section and cab frame for selectively retaining the lower edge of the lower section in the notches of the elements on the upper window section and cab frame, respectively.

8. The invention defined in claim 7, further characterized by an inwardly biased latch supported on the cab adjacent the roof of the cab and having an upwardly facing shoulder engageable with the edge of the upper panel when the latter is swung inwardly and upwardly to approach a horizontal position adjacent the roof of the cab.

* * * * *